US007660019B2

(12) United States Patent
Gonzalez et al.

(10) Patent No.: US 7,660,019 B2
(45) Date of Patent: Feb. 9, 2010

(54) PRODUCTS WITH DATA-ENCODING PATTERN

(75) Inventors: Manuel Gonzalez, Malaga (ES);
Andreu Gonzalez, Barcelona (ES);
Virginia Palacios, Terrassa (ES);
Emiliano Bartolome, Pontevedra (ES);
Lluis Abello, Tarragona (ES); Steven J. Simske, Fort Collins, CO (US); Paolo Faraboschi, Barcelona (ES); Roland John Burns, Sant Cugat des Valles (ES);
Andrew Mackenzie, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 621 days.

(21) Appl. No.: 11/186,883

(22) Filed: Jul. 22, 2005

(65) Prior Publication Data
US 2006/0024617 A1    Feb. 2, 2006

(30) Foreign Application Priority Data
Jul. 29, 2004    (GB) ................... 0416862.1

(51) Int. Cl.
*H04N 1/40*    (2006.01)
*G06K 9/00*    (2006.01)

(52) U.S. Cl. ..................... 358/3.28; 382/100

(58) Field of Classification Search ............... 347/129, 347/112, 111; 368/62, 82, 83, 223, 239, 368/241; 358/474, 471, 400, 1.12, 487; 382/100
See application file for complete search history.

(56) References Cited

U.S. PATENT DOCUMENTS

| 5,304,789 | A |   | 4/1994 | Lob et al. |
| 5,502,304 | A |   | 3/1996 | Berson et al. |
| 5,510,163 | A | * | 4/1996 | Sullivan et al. ............ 428/64.1 |
| 5,717,597 | A | * | 2/1998 | Kara .......................... 705/408 |
| 5,882,463 | A | * | 3/1999 | Tompkin et al. ............ 156/234 |
| 6,005,691 | A | * | 12/1999 | Grot et al. ....................... 359/2 |
| 6,651,894 | B2 | * | 11/2003 | Nimura et al. ............... 235/494 |

FOREIGN PATENT DOCUMENTS

JP    10-004934    1/1998

* cited by examiner

*Primary Examiner*—Gabriel I Garcia (57) ABSTRACT

A method and apparatus for producing a document having human-readable content and a position identifying encoding pattern. A printer places text or other content onto a substrate, such as paper, and a filter material application system applies transparent filter material to at least a portion of that content to only modify the reflectivity of the content at a predetermined wavelength. Because the reflectivity of the position identifying encoding pattern remains unchanged, it is distinguishable from the content and can be read at the predetermined wavelength. The position identifying pattern can take a number of forms including a number of dots printed at predetermined positions on the substrate on an imaginary grid.

16 Claims, 6 Drawing Sheets

PRODUCTS WITH DATA-ENCODING PATTERN

FIELD OF THE INVENTION

The present invention relates to products having human readable content and data encoding pattern thereon.

BACKGROUND TO THE INVENTION

It is known to provide data encoding pattern on products, for example documents, so that a hand held device, such as a pen, can read the data encoded in the pattern and use it, for example, to detect its position as it is moved over the document. Where the hand held device is a pen arranged to mark the product, the position of marks made on the documents can be detected by the pen, thereby enabling the position of the marks on the document to be stored electronically as they are made.

Where the product has human readable content applied to it as well as the position identifying pattern, it can be a problem to ensure that the pattern is not obscured by the content. It is possible to overcome this problem by printing the pattern and the content using different inks. This enables the pen to detect the pattern using light at a wavelength that is absorbed or reflected by the pattern but not the content, or by the content and not the pattern. However, this requires the use of two different inks, which can add to the complexity of the printing process.

SUMMARY OF THE INVENTION

The present invention provides a method of applying content and a data encoding pattern to a product, the method comprising:
  applying the content to a substrate;
  modifying the reflectivity of the content at a predetermined wavelength; and
  applying the pattern to the product,
  the method being such that the pattern is distinguishable from the content at the predetermined wavelength.

It will be appreciated that modifying the reflectivity of the content will generally also involve modifying the absorption of the content. Therefore the step of modifying the reflectivity is equivalent to modifying the absorption.

The reflectivity, or the absorption, of the content may be modified in a number of ways. For example filter material may be applied over the content to increase its reflectivity, and reduce its absorption. The reflectivity of the content may be modified by the manner in which it is applied to the substrate. For example the content may be applied to the rear surface of a layer of filter material, and then that rear surface brought into contact with the substrate thereby simultaneously applying the content to the substrate and increasing its reflectivity by covering it with the filter material.

The data encoding pattern may be a position identifying pattern. Such a pattern may be arranged such that any part of the pattern, provided it is of a large enough area, uniquely defines a position on the product.

The present invention further provides apparatus for use in producing a document having content and data encoding pattern thereon, the apparatus comprising a printing system arranged to print the content onto a substrate and a reflectivity modifying system arranged to modify the reflectivity of the content at a predetermined wavelength such that the pattern is distinguishable from the content at the predetermined wavelength.

A corresponding product is also provided.

In another aspect of the invention, a product having content thereon is provided, the product having a data encoding pattern, and filter material between the data encoding pattern and the content, wherein the filter material overlaps with the content on at least a part of the product. A method of applying a data encoding pattern to a product is also provided, the method comprising:
  providing a product with a content;
  modifying the reflectivity of the content at a predetermined wavelength; and
  applying the pattern to the product so as to overlap with the content on at least a part of the product,
  the method being such that the pattern is distinguishable from the content at the predetermined wavelength.

Preferred embodiments of the present invention will now be described by way of example only with reference to the accompanying drawings.

DESCRIPTION OF THE PREFERRED EMBODIMENTS

Figure 1:
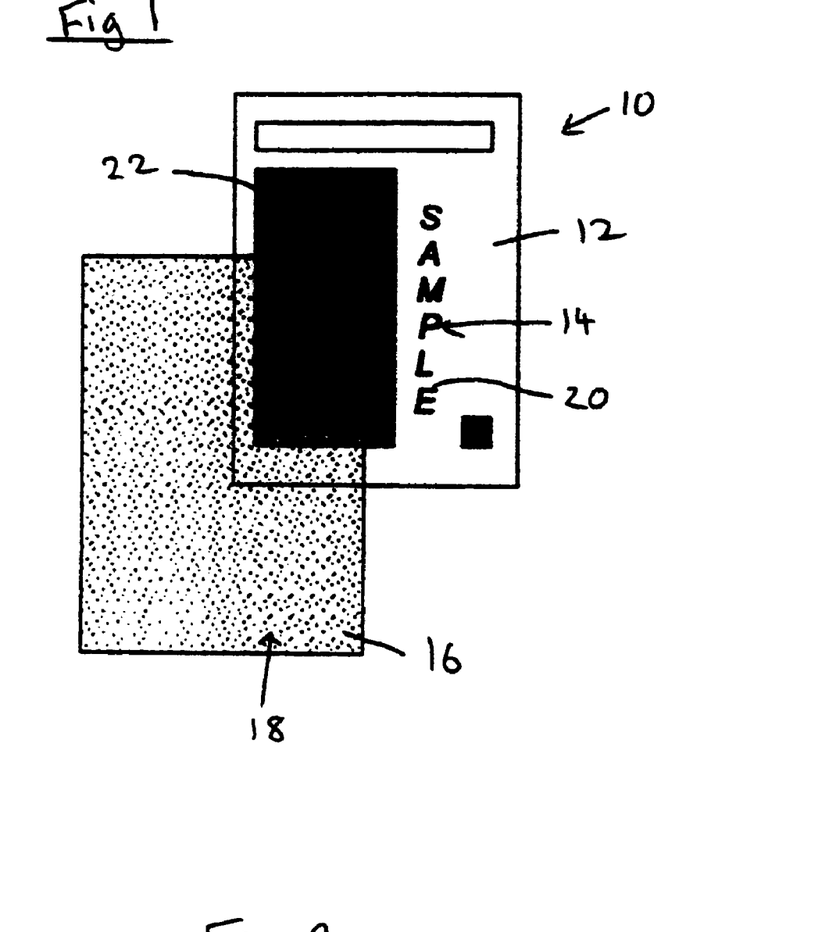
FIG. 1 shows the component parts of a document according to a first embodiment of the invention.

Referring to FIG. 1 a document 10 according to an embodiment of the invention comprises a paper substrate 12 having content 14 printed on it, and a filter layer 16 having a machine-readable position identifying pattern 18 on it. The document 10 is a form, and the content 14 comprises text 20 and graphics 22, which are printed onto the substrate 12 using a carbon-based black ink as a marking material, by means of a monochrome laser jet printer. This marking material is relatively un-reflective of light at visible wavelengths, so that it appears black to the human eye, and un-reflective at infrared wavelengths also so that IR light will be absorbed by it, and it will appear 'black' i.e. non-reflective, to the IR sensor. The substrate 12 has a higher reflectivity at infra red wavelengths then the ink so that the ink can normally be detected by an IR sensing system when applied to the substrate. The filter layer 16 comprises a film of material that is transparent at visible wavelengths, but opaque to, and highly reflective of, infra-red light. The filter layer 16 has the position identifying pattern 18 printed onto its upper surface using the same carbon-based black ink as the content 14 of the document. The position identifying pattern can take a number of forms for example it may comprise a number of dots printed at predetermined positions on an imaginary grid, as described in our copending patent application GB 0321174.5, or as described in WO 01/26032.

Figure 2:
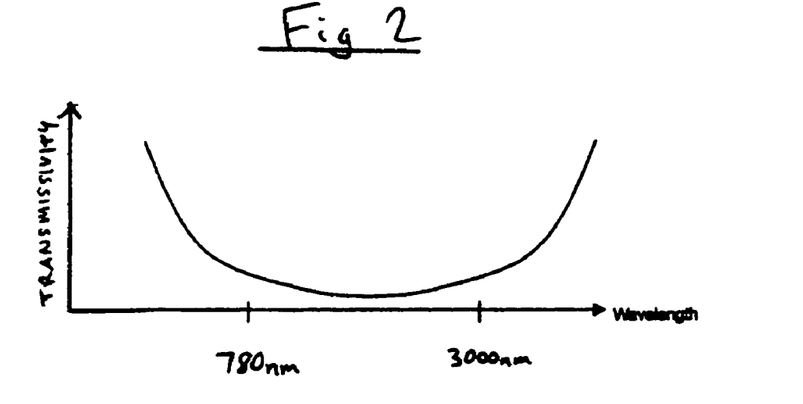
FIG. 2 is a graph showing the filter characteristic of a filter layer of the document of FIG. 1.

Referring to FIG. 2, the filter layer 16 has a transmissivity that is high for visible wavelengths of within a wavelength band from 400 nm to 700 nm, but low for infra-red wavelengths between about 780 nm and 3000 nm. In this IR wavelength range the filter layer 16 has a high reflectivity, and low absorption. In particular the reflectivity of the filter layer 16 is higher in the IR range than the ink that forms the content and pattern, and its absorption is lower in the IR range. The filter layer therefore increases the reflectivity and reduces the absorption of the content over which it extends. The result of this structure of the document is that the reflectivity of the content at IR wavelengths is different from the reflectivity of the pattern at IR wavelengths. Therefore if IR light is directed at the document, the position identifying pattern 18 on the top surface of the filter layer 16 will absorb it, but the incident IR light that does not strike the pattern will be reflected by the filter layer 16, regardless of whether it strikes an area where there is content, or an area where there is not content or pattern. Therefore an IR sensor held over the document will detect IR light reflected from all areas of the document except those covered by the pattern 18, but will not detect significant levels of light reflected from the pattern 18. It will therefore be able to image the pattern but not the content.

Figure 3:
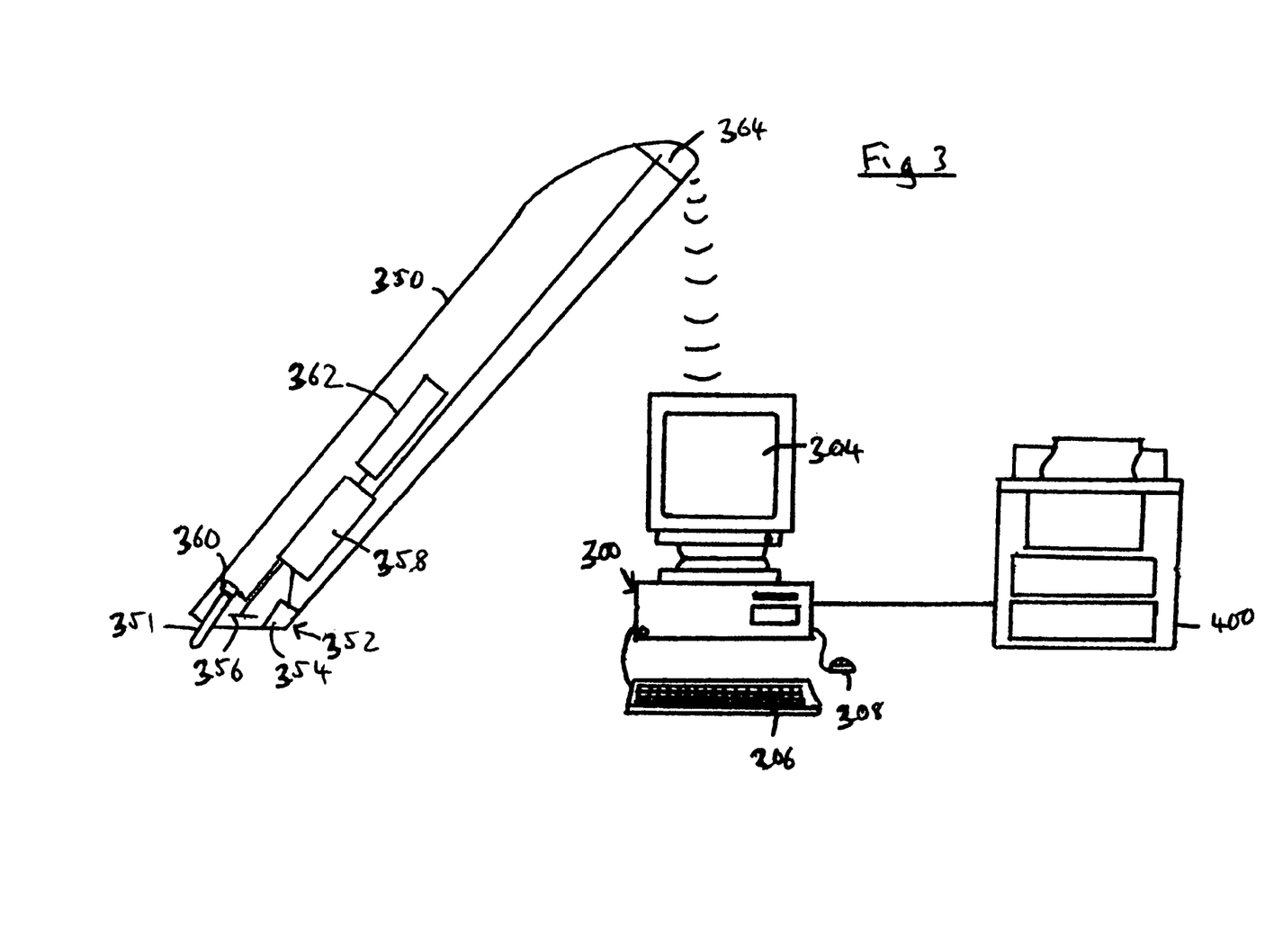
FIG. 3 is a schematic diagram of a system for processing the document of FIG. 1.

Referring to FIG. 3, a pen 350 for reading the pattern areas comprises a writing nib 351, and a camera 352 made up of an infra red (IR) LED 354 and an IR sensor 356. The camera 352 is arranged to image a circular area adjacent to the tip of the pen nib 351. A processor 358 processes images from the camera 352 taken at a predetermined rapid sample rate. A pressure sensor 360 detects when the nib 351 is in contact with the document 10 and triggers operation of the camera 352. Whenever the pen is being used on a patterned area of the document 10, the processor 358 can therefore determine from the pattern 18 the position, within the defined pattern area, of the pattern 18 over which the pen 350 is being passed. The sequence of positions is saved in the pen's memory 362 as pen stroke data, and can be transmitted to the PC 300 via a radio frequency transmitter 364 in the pen 350. A simple cable connection can also be used. Suitable pens are available from Logitech under the trade mark Logitech Io.

Figure 3A:
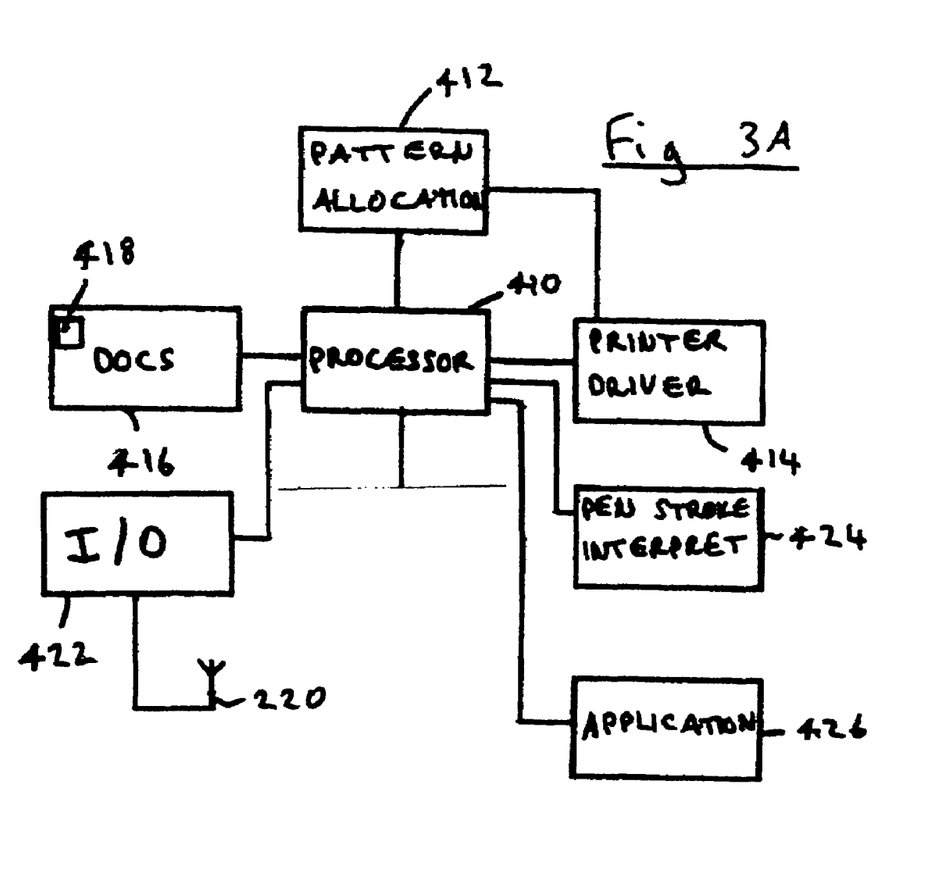
FIG. 3A is a schematic diagram of a system according to an embodiment of the invention for producing the document of FIG. 1.

A very simple system according to an embodiment of the invention for designing and producing printed documents 100 having the position identifying pattern on them comprises a personal computer (PC) 300 and a printer 400. The PC 30 has a screen 304, a keyboard 306 and a mouse 308 connected to it. As shown in FIG. 3A, the PC 301 comprises a processor 410 and a pattern allocation module 412 which is a software module stored in memory. The pattern allocation module 412 includes the definition of the total area of pattern space and a record of which parts of that total area have been allocated to specific documents, for example by means of coordinate references. It also includes a definition of the areas of pattern 18. The PC 300 further comprises a printer driver 414, which is a further software module, and a memory 416 having electronic documents 418 stored in it. A user interface allows a user to interact with the PC 301.

When a document 418 is to be printed, the electronic document is retrieved from memory 416. This document includes a definition of the content of the document. The printer driver 414 also requests the required amount of pattern from the pattern allocation module 412, which allocates an area of pattern to the document. Printing of the content and the pattern can be achieved in a number of different ways, as will be described in more detail below.

Figure 4:
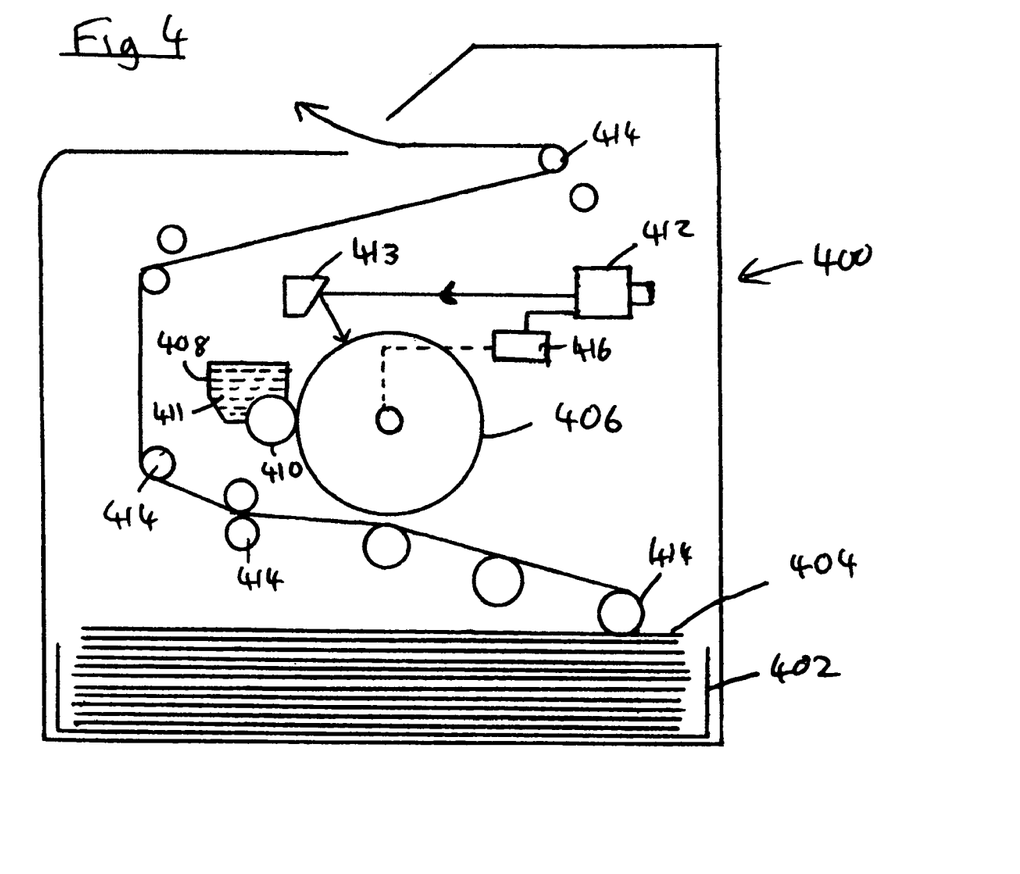
FIG. 4 is a schematic diagram of a system according to a further embodiment of the invention for producing a document.

Referring to FIG. 4, the printer 400 is a monochrome laser-jet printer 400 arranged to print the content 14 and the position identifying pattern 18 of the document 10. The printer 400 comprises a paper tray 402 in which paper 404 can be stored ready for printing, a photoreceptor drum 406 arranged to apply ink to the paper 404, an ink reservoir 408 and ink transfer roller 410 arranged to transfer ink 411 from the reservoir 408 to the drum 406. A scanning laser source 412 and reflector 413 are arranged to direct laser light at parts of the drum 406 to charge them electrostatically, whilst leaving other parts of the drum 406 uncharged. The charged areas of the drum 406 collect ink from the reservoir 408 via the transfer roller 410, and the uncharged areas of the drum 406 collect no ink. A controller 416 is arranged to control the scanning laser source 412, which is turned on and off as it scans across the surface of the drum 406, thereby to control which areas of the drum 406 transfer ink to the paper, and hence which areas of the paper 404 have ink 411 applied to them and which do not. The paper is transferred from the paper tray 402, past the drum 406, and out of the printer 400 by means of a number of rollers 414, also under control of the controller 416.

In a simple process for producing the document 10, the substrate 12 comprises a sheet of paper 404 from the paper tray 402 of the printer 400, which is printed on its top surface with content 14 in conventional manner from black carbon based ink 411 using the printer 400. A sheet of filter material 16 is then loaded into the paper tray 402 and printed on its top surface with position identifying pattern 18 using the same ink 411. The sheet of filter material 16 is then placed over the top surface of the paper 404, with its top surface away from the paper 404 and its under surface towards the paper 404, and attached to the paper 404, for example by adhesive. The content 14 is therefore covered by the filter layer 16, and the position identifying pattern 18 carried on the outer surface of the filter layer 16. The pattern covers the whole surface of the document and therefore overlaps with the content.

When the pen 350 is used to write on the document 10, the camera 352 detects the pattern 18 using light from the IR source 354 that is reflected from all areas of the document except the pattern 18 on the top surface of the filter layer 16. Therefore the reflectivity of the content at IR wavelengths is increased so that the same levels of IR light, from the source 354, are reflected by the content 14 as by the areas of the document having no content or pattern on them. The pattern 10 can therefore be detected by the detector 356. The IR camera 352 in the pen 350 will therefore form an image that includes the pattern 18 but does not include the content 14. Therefore in areas of the document where the pattern 18 and the content 14 are superimposed on each other, the camera 352 in the pen 350 will still be able to form an image of the pattern that is not obscured by the content 14. This enables the pen to determine its position on the document 10 over the whole of the area of the document 10 including areas of overlap of the pattern 18 and content 14. To the human eye the pattern 18 may be obscured by the content in such areas of overlap, because the filter layer 16 is not effective at visible wavelengths. However this means that the content 14 remains visible to through the filter layer 16, and since the pattern 18 is made up of a number of small dots it appears to the human eye as a light grey shading and generally does not obscure the content 14.

It will be understood that the document 10 may comprise other layers. For example the paper 12 could have other coatings applied to it before the content 14 is printed onto it. Also other coatings could be applied over the content 14 either before or after the filter material 16, provided they do not adversely affect the optical properties of the document.

Furthermore additional layers of material can be applied over the pattern 18, for example to provide further protection, provided of course that they allow the IR light to be transmitted through them.

In a further modification to this method, the content may be printed onto the rear side of the filter layer 16, and the pattern 18 printed onto the front side of the filter layer 16. The filter layer is then applied to the paper substrate with its rear side downwards. This simultaneously applies the content to the paper, and covers the content with the filter layer thereby increasing its reflectivity. It also results in the content being between the filter layer 16 and the paper substrate 12, and the pattern 18 being on top of the filter layer 16.

Figure 5:
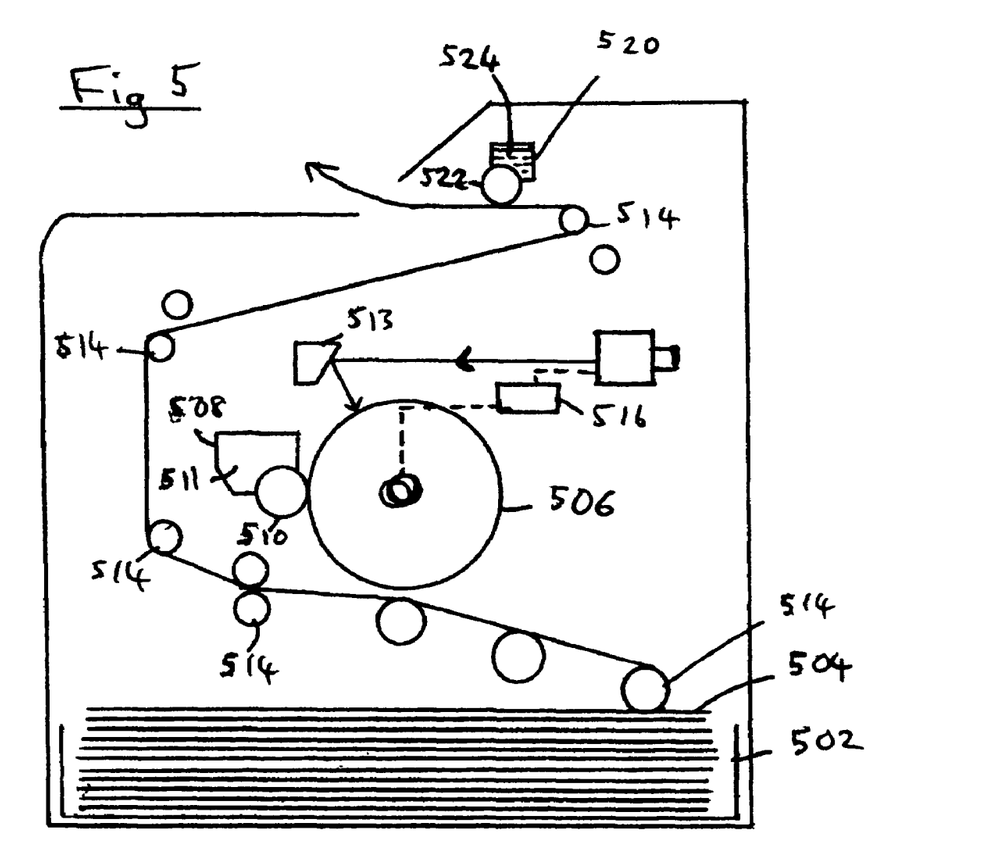
FIG. 5 is a schematic section through a printer according to a further embodiment of the invention for producing a document.

Referring to FIG. 5, a printer according to a second embodiment of the invention is similar to that of FIG. 4 with corresponding components indicated by the same reference numerals increased by 100. In this case the printer includes a further reservoir 520 for liquid filter material and a filter layer application roller 522 arranged to apply a layer of the filter material 524 over the whole of the top surface of the document 504 after the content has been printed onto it. The filter material 524 in this case is and cures after application to form a continuous filter layer over the surface of the document, covering the content that has been printed onto the paper 504. The paper 504 with the content and filter layer applied to it is then passed through the printer again, which is this time arranged to print the pattern onto the filter layer using the carbon based ink from the reservoir 508. When the pattern is being printed the filter layer application roller 522 is retracted so that filter material 524 is not applied over the pattern. Once the pattern has been printed the document is essentially the same as that produced on the system of FIG. 4 as described above, with the position identifying pattern visible to the IR camera and the content invisible to the IR camera because it is obscured by the layer of filter material 524.

It will be appreciated that, rather than the filter material being applied as a continuous layer over the whole surface of the paper 504, it can be applied only on those areas that have content applied to them, provided the whole of the content is covered by the filter material.

In a modification to the system of FIG. 5, the printer can be arranged to apply the filter material to both sides of the document. This forms a protective coating over the whole document that can be used either to strengthen the document or to render it waterproof. The same effect can be obtained by applying the pre-prepared layers of filter material 16 of FIG. 1 to both sides of the document, or different types of material to the front and rear of the document. Clearly if the content is only applied to one side of the document then the filter material only needs to be applied to that side, and a non-filtering material can be used as a coating on the rear, but if content and pattern are applied to both surfaces then the filter material needs to be used on both surfaces.

Figure 6:
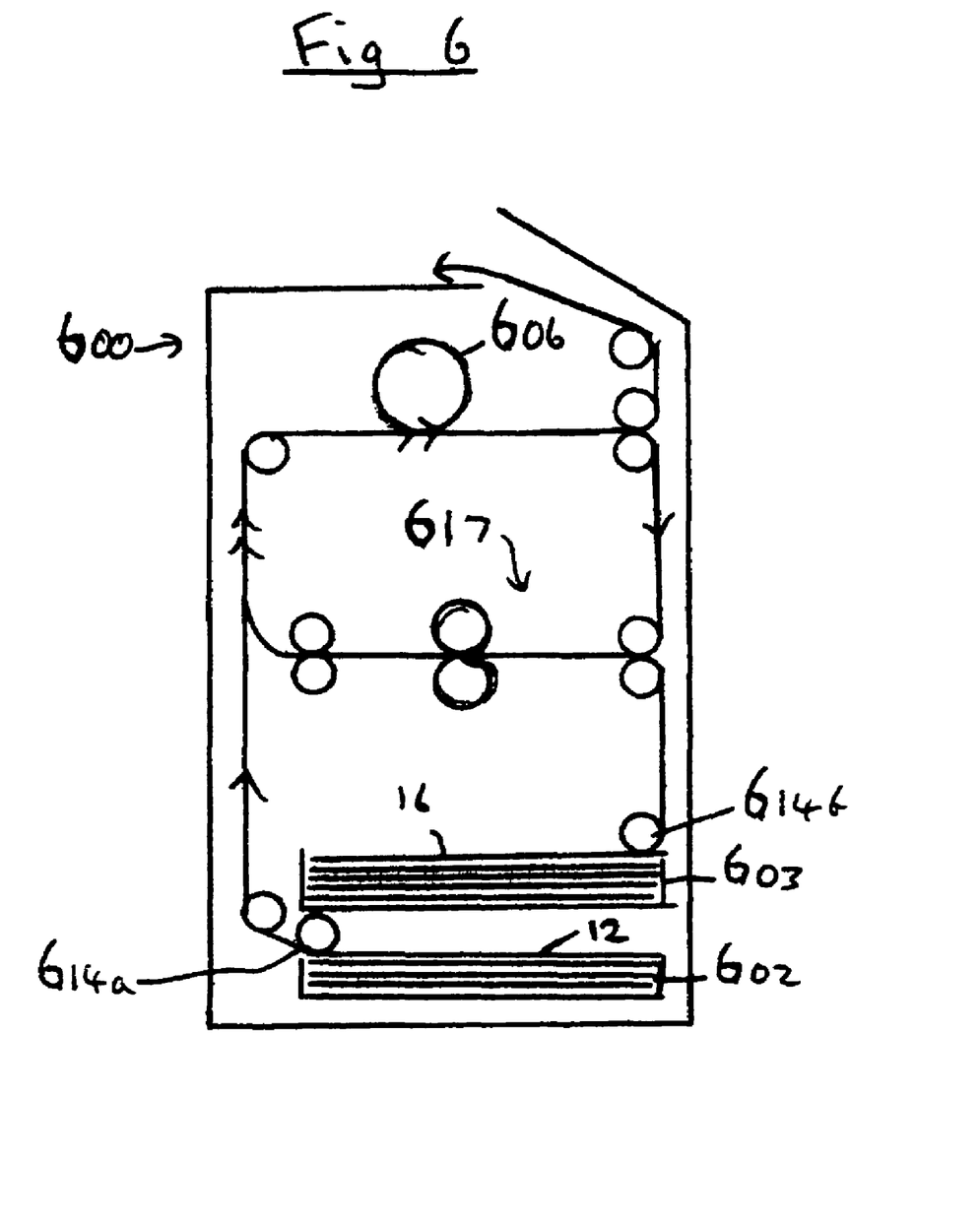
FIG. 6 is a schematic section through a printer according to a further embodiment of the invention for producing a document.

It will be appreciated that the production of the documents as described with reference to FIGS. 4 and 5 can be automated to a greater or lesser extent. For example, referring to FIG. 6, an automated document producing system comprises a printer 600 which is similar to that shown in FIG. 4, with two paper trays 602, 603, one of which 602 is loaded with paper 12 and the other of which 603 is loaded with sheets of filter material 16. The system is arranged to pick up a sheet of paper from the paper tray 602 and print the content onto the paper. It is then arranged to pick up a sheet of filter material 16 from the filter material tray 603 and transfer it to a laminating station 617 where the filter layer 16 is applied to the top surface of the paper 12 over the printed content, and affixed to it, for example my means of adhesive. It then passes the laminated paper and filter layer back through the printer and prints the pattern 18 onto the top surface of the filter layer 16.

In a particular embodiment, the invention is used in the medical field with a substrate such as an X-Ray print. In this particular embodiment, the filter may overlap at least part of the content and may comprise a visible grid in addition to the pattern. The grid may assist a practitioner to take measurements on the print. The grid may be a linear Cartesian grid or may be a non-linear grid suited for specific measurements. Measurements and comments written by the practitioner may be recorded using a pen as in FIG. 3.

While the examples described above use IR light and modification in reflectivity of the content at IR wavelengths, the system can work equally well with other wavelengths or ranges of wavelengths. For example visible or UV wavelengths could be used.

Also the wavelength of light used, and at which the sensor can detect, can be one at which the pattern and the content are both reflective, or at least more reflective than filter layer. The filter layer will then absorb more of the light at that wavelength than the pattern. The pattern will therefore still be visible to the sensor because it still has a different reflectivity at the relevant wavelength to the filter layer. However, it will reflect more light than the filter layer, rather than less.

In the other aspect of the invention, the filter overlaps at lest part of the content as for example in FIG. 1. In an embodiment, 10 is not a document but a screen such as a TV, printer, tablet PC, vending machine, cash machine, mobile phone, camera or computer screen for example. In the same manner as described for a document, the filter of the invention overlaps at least partially the screen. In an embodiment of this aspect, the pattern is a position identifying pattern allowing interaction with a screen using a pen as described in FIG. 3. This provides a simple way of creating an equivalent of touch screen. In a particular embodiment, this aspect is put into practice for voting on screen or passing examinations on screens. In a particular embodiment, the filter is transparent for at least some of the wavelengths of the human visible spectrum.

The invention claimed is:

1. A method of applying a position identifying data encoding pattern to a product, the method comprising:
   providing a product with content included on the product;
   applying a filter material over at least a portion of the content; and
   applying a position identifying pattern to at least one side of the filter material,
   in which the filter material is configured to modify the reflectivity of the content at a predetermined wavelength, and
   in which the position identifying pattern is distinguishable from the content at the predetermined wavelength.

2. A method of claim 1, in which the product comprises a substrate.

3. A method of claim 2, in which the content and the position identifying pattern are formed from the same marking medium.

4. A method of claim 2, in which the reflectivity of the position identifying pattern remains unchanged by the filter material.

5. A method of claim 1, in which the filter material is applied to the substrate as a liquid.

6. A method of claim 1, in which the filter material is applied to the substrate as a pre-formed sheet.

7. A method of claim 1, in which the position identifying pattern is applied to the filter material after the filter material has been applied to the substrate.

8. A method of claim 6, in which the position identifying pattern is applied to the document with the filter material.

9. A method of claim 8, in which the position identifying pattern is applied to a first surface of the filter material, and
   a second surface of the filter material, opposite from the first surface, is applied to the content.

10. A method of claim 1, in which the position identifying pattern is applied to an entire surface of the product in which the content is positioned.

11. An apparatus for producing a document having content and a position identifying data encoding pattern thereon, the apparatus comprising:
   a printing system arranged to print the content onto a substrate; and
   a filter material application system configured to apply filter material to at least a portion of the content;
   in which the filter material is configured to modify the reflectivity of the content at a predetermined wavelength,
   in which the reflectivity of the position identifying pattern remains unchanged by the filter material, and
   in which the position identifying pattern is distinguishable from the content at the predetermined wavelength.

12. The apparatus of claim 11, in which the filter material is configured to increase the reflectivity and reduce the absorption of the content.

13. The apparatus of claim 11, in which the filter material application system is configured to apply the filter material as a liquid.

14. The apparatus of claim 11, in which the filter material application system is configured to apply the filter material as a preformed sheet.

15. The apparatus of claim 11, in which the printing system is further configured to apply the position identifying data encoding pattern to the document.

16. The apparatus of claim 15, in which the printing system is further configured to apply the position identifying pattern to the filter material.

* * * * *